United States Patent
Kowalczyk (10) Patent No.: US 10,132,956 B2
(45) Date of Patent: Nov. 20, 2018

(54) COMPENSATION OF MAGNETIC DATA FOR AUTONOMOUS UNDERWATER VEHICLE MAPPING SURVEYS

(71) Applicant: Ocean Floor Geophysics, Inc., Burnaby (CA)

(72) Inventor: Peter Kowalczyk, Surrey (CA)

(73) Assignee: OCEAN FLOOR GEOPHYSICS, INC. (CA)

(*) Notice: Subject to any disclaimer, the term of this patent is extended or adjusted under 35 U.S.C. 154(b) by 6 days.

(21) Appl. No.: 14/860,099

(22) Filed: Sep. 21, 2015

(65) Prior Publication Data
US 2016/0097875 A1    Apr. 7, 2016

Related U.S. Application Data (60) Provisional application No. 62/058,398, filed on Oct. 1, 2014.

(51) Int. Cl.
| | | |
|---|---|---|
| G05D 1/00 | (2006.01) |
| G05D 3/00 | (2006.01) |
| G06F 7/00 | (2006.01) |
| G01V 3/38 | (2006.01) |
| B63G 8/00 | (2006.01) |
| B63H 23/00 | (2006.01) |
| G01V 3/165 | (2006.01) |

(Continued)

(52) U.S. Cl.
CPC .............. *G01V 3/38* (2013.01); *B63G 8/001* (2013.01); *B63G 8/34* (2013.01); *B63H 23/00* (2013.01); *G01V 3/165* (2013.01); *G01V 3/40* (2013.01); *G05D 1/048* (2013.01); *B63G 2008/004* (2013.01)

(58) Field of Classification Search
CPC .... B63G 2008/004; B63G 8/001; B63G 8/34; B63H 23/00; B64C 2201/141; G01R 33/032; G01V 3/165; G01V 3/38; G01V 3/40; G05D 1/0088; G05D 1/048; G05D 1/101

See application file for complete search history.

(56) References Cited

U.S. PATENT DOCUMENTS 3,808,519 A * 4/1974 Lemercier .............. G01V 3/165
                                                           324/326
3,897,743 A * 8/1975 Schoonman ........... B63G 8/001
                                                           114/321

(Continued)

FOREIGN PATENT DOCUMENTS

| JP | S58-2678 | 1/1983 |
| JP | 2004-525347 | 8/2004 |

(Continued)

OTHER PUBLICATIONS

Bloomer et al., "Compensation of magnetic data for autonomous underwater vehicle mapping surveys," IEEE/OES, 2014, 4 pages.

(Continued)

*Primary Examiner* — Khoi H Tran
*Assistant Examiner* — Jorge O Peche
(74) *Attorney, Agent, or Firm* — Sheridan Ross P.C.

(57) ABSTRACT

Embodiments of the present invention are generally related to compensation of magnetic data, and, in particular, to a system and method for compensation of magnetic data as collected during autonomous underwater vehicle mapping surveys.

22 Claims, 6 Drawing Sheets

(51) Int. Cl.
  *G01V 3/40* (2006.01)
  *G05D 1/04* (2006.01)
  *B63G 8/34* (2006.01)

(56) References Cited

U.S. PATENT DOCUMENTS

| | | | | |
|---|---|---|---|---|
| 4,109,199 | A * | 8/1978 | Ball | G01R 33/02 |
| | | | | 324/202 |
| 4,228,395 | A * | 10/1980 | Dusheck, Jr. | G01V 3/165 |
| | | | | 324/331 |
| 4,433,626 | A * | 2/1984 | Landström | F42B 12/10 |
| | | | | 102/390 |
| 4,538,230 | A * | 8/1985 | Reust | G05D 1/048 |
| | | | | 114/331 |
| 4,995,165 | A * | 2/1991 | Daniels | G01R 33/0206 |
| | | | | 324/244 |
| 5,136,547 | A * | 8/1992 | Laukien | B63G 8/34 |
| | | | | 367/1 |
| 5,182,514 | A * | 1/1993 | Rice, Jr. | G01R 33/025 |
| | | | | 324/244 |
| 5,208,784 | A * | 5/1993 | Laukien | B63G 8/34 |
| | | | | 367/1 |
| 5,218,300 | A * | 6/1993 | Gouhier-Beraud | G01V 3/087 |
| | | | | 324/244 |
| 5,764,061 | A * | 6/1998 | Asakawa | G01V 3/02 |
| | | | | 324/247 |
| 6,018,501 | A * | 1/2000 | Smith | E21B 47/0001 |
| | | | | 367/134 |
| 6,179,067 | B1 * | 1/2001 | Brooks | E21B 47/022 |
| | | | | 175/45 |
| 6,508,316 | B2 * | 1/2003 | Estes | E21B 47/022 |
| | | | | 175/45 |
| 6,765,383 | B1 * | 7/2004 | Barringer | G01V 3/16 |
| | | | | 324/330 |
| 7,180,418 | B1 * | 2/2007 | Willms | G08B 25/10 |
| | | | | 250/287 |
| 8,311,767 | B1 * | 11/2012 | Stetson | G01R 33/032 |
| | | | | 702/152 |
| 8,378,671 | B1 * | 2/2013 | Mahoney | G01R 33/02 |
| | | | | 324/248 |
| 8,392,142 | B1 * | 3/2013 | Conner | G01R 33/022 |
| | | | | 324/244 |
| 8,931,326 | B1 * | 1/2015 | Fowler | G01C 21/16 |
| | | | | 73/1.76 |
| 2002/0196505 | A1 * | 12/2002 | Cordier | H04B 10/806 |
| | | | | 398/147 |
| 2008/0125920 | A1 * | 5/2008 | Miles | B64C 39/024 |
| | | | | 701/2 |
| 2008/0284441 | A1 * | 11/2008 | Kowalczyk | G01V 3/104 |
| | | | | 324/334 |
| 2010/0019589 | A1 * | 1/2010 | Saban | H02K 1/02 |
| | | | | 310/52 |
| 2011/0010095 | A1 * | 1/2011 | Dyer | G01V 3/16 |
| | | | | 702/5 |
| 2011/0044831 | A1 * | 2/2011 | Cunningham | F04D 1/063 |
| | | | | 417/410.1 |
| 2011/0052432 | A1 * | 3/2011 | Cunningham | F04D 13/10 |
| | | | | 417/423.3 |
| 2012/0067268 | A1 * | 3/2012 | Guerrero | G01V 3/12 |
| | | | | 114/321 |
| 2012/0130641 | A1 * | 5/2012 | Morrison | G01V 3/26 |
| | | | | 702/7 |
| 2013/0166212 | A1 * | 6/2013 | Zhandov | G01V 3/165 |
| | | | | 702/5 |
| 2013/0222115 | A1 * | 8/2013 | Davoodi | H04Q 9/00 |
| | | | | 340/10.1 |
| 2013/0239869 | A1 * | 9/2013 | Hesse | B63G 7/02 |
| | | | | 114/330 |
| 2013/0244710 | A1 * | 9/2013 | Nguyen | G01S 13/0209 |
| | | | | 455/501 |
| 2014/0152455 | A1 * | 6/2014 | Giori | G01V 11/00 |
| | | | | 340/850 |
| 2014/0165898 | A1 * | 6/2014 | Cierpka | G01S 15/89 |
| | | | | 114/312 |
| 2014/0285206 | A1 * | 9/2014 | West | G01V 3/107 |
| | | | | 324/333 |
| 2015/0234072 | A1 * | 8/2015 | McConnell | G01V 1/3861 |
| | | | | 367/156 |

FOREIGN PATENT DOCUMENTS

| | | |
|---|---|---|
| WO | WO 99/50619 | 10/1999 |
| WO | WO 2012/068362 | 5/2012 |

OTHER PUBLICATIONS

Honsho et al., "Deep-sea magnetic vector anomalies over the Hakurei hydrothermal field and the Bayonnaise knoll caldera, Izu-Ogasawara arc, Japan," Journal of Geophysical Research, 2013, vol. 118, pp. 1-18.

Kowalczyk, "Geophysical prelude to first exploitation of submarine massive sulphides," First Break, 2008, vol. 26, pp. 99-106.

Kowalczyk, "AUV and ROV Magnetometer Surveys, Compensation," Ocean Floor Geophysics, The 43rd Conference of the Underwater Mining Institute, Lisbon, Portugal, 2014, 20 pages.

Pei et al., "UXO Survey using Vector Magnetic Gradiometer on Autonomous Underwater Vehicle," DSO National Laboratories, Singapore, 2009, pp. 1-8.

Tivey et al., "The Magnetic Signature of Hydrothermal Systems in Slow Spreading Environments," Dept. of Geology and Geophysics, Woods Hole Oceanographic Institution, 2010, 64 pages.

Sulzberger et al., "Hunting Sea Mines with UUV-Based Magnetic and Electro-Optic Sensors," Naval Surface Warfare Center Panama City, 2009, 5 pages.

International Search Report and Written Opinion for International (PCT) Patent Application No. PCT/IB2015/002050, dated Jan. 26, 2016, 8 pages.

Kowalczyk "Geophysical exploration for Submarine Massive Sulfide deposits," Oceans 2011, IEEE, Sep. 19, 2011, pp. 1-5.

Okino et al. "Discovery and characterization of a new hydrothermal vent based on magnetic and acoustic surveys," Underwater Technology Symposium, 2013 IEEE International, Mar. 2013, (abstract only).

Smith et al. "Aspects of Heading Determination via Fusion of Inclinometer and Magnetometer Data," Advanced Robotics, 1997, ICAR '97 Proceedings, 8th International Conference on Monterey, CA, USA Jul. 7-9, 1997, IEEE, pp. 739-744.

International Preliminary Report on Patentability for International (PCT) Patent Application No. PCT/IB2015/002050, dated Apr. 13, 2017 5 pages.

Official Action for Australia Patent Application No. 2015264953, dated Jun. 16, 2016 2 pages.

Notice of Acceptance for Australia Patent Application No. 2015264953, dated May 16, 2017 3 pages.

Official Action for Canada Patent Application No. 2,911,541, dated Oct. 31, 2016 3 pages.

Official Action for Canada Patent Application No. 2,911,541, dated Jun. 7, 2017 3 pages.

Extended Search Report for European Patent Application No. 15834627.0, dated Jun. 14, 2017 12 pages.

Official Action with English Translation for Japan Patent Application No. 2016-551104, dated Jan. 10, 2017 12 pages.

Official Action with English Summary for Korea Patent Application No. 10-2015-7033413, dated Dec. 11, 2017 10 pages.

Official Action for New Zealand Patent Application No. 714025, dated Aug. 22, 2017 6 pages.

Notice of Allowance for Canada Patent Application No. 2,911,541, dated Jun. 5, 2018, 1 page.

Official Action for New Zealand Patent Application No. 714025, dated Apr. 6, 2018 5 pages.

Official Action with English translation for Japan Patent Application No. 2016-551104, dated Jan. 9, 2018, 7 pages.

\* cited by examiner

TABLE 1. ALTITUDES OF THE AUV DURING CALIBRATION MANEUVER.

| Sq 1 | Ref | Start | 30m | End | Sq 2 | Ref | Start | 30m | End |
|---|---|---|---|---|---|---|---|---|---|
| Leg 1 | A | 50m | 50m | 70m | Leg 1 | D | 50m | 50m | 70m |
| Leg 2 | B | 70m | 70m | 50m | Leg 2 | C | 70m | 70m | 50m |
| Leg 3 | C | 50m | 50m | 70m | Leg 3 | B | 50m | 50m | 70m |
| Leg 4 | D | 70m | 70m | 50m | Leg 4 | A | 70m | 70m | 50m |

COMPENSATION OF MAGNETIC DATA FOR AUTONOMOUS UNDERWATER VEHICLE MAPPING SURVEYS

CROSS REFERENCE TO RELATED APPLICATIONS

This application claims priority to and the benefit of U.S. Provisional Patent Application No. 62/058,398 entitled "Compensation of Magnetic Data for Autonomous Underwater Vehicle Mapping Surveys" filed on Oct. 1, 2014, the entire disclosure of which is incorporated by reference herein.

FIELD

Embodiments of the present invention are generally related to compensation of magnetic data, and, in particular, to a system and method for compensation of magnetic data as collected during autonomous underwater vehicle mapping surveys.

BACKGROUND

Magnetic surveying is well established in land based mineral exploration. Magnetic data is routinely used to map geology in covered terrains, to identify altered zones, mineralization, bedding attitudes, and fault networks. Typically this surveying is done from an airplane, and is used to map geology in covered terrains, to estimate the depth to basement in overburden covered areas, and to identify altered zones, mineralization, bedding attitudes, and fault networks. In ocean based surveys, particularly those under the sea, magnetic surveys are being done in specialized applications. These applications mainly require high resolution magnetic mapping, and Automated Underwater Vehicles (AUVs). AUVs are a good platform for these surveys because they are capable of flying close to the target of interest. In military applications, AUVs are used for naval mine-hunting and unexploded ordinance applications: Sulzberger, *Hunting Sea Mines with UUV-Based Magnetic and Electro-Optic Sensors*, OCEANS 2009, MTS/IEEE Biloxi, pp. 1-5, and Pei, *UXO Survey using Vector Magnetic Gradiometer on Autonomous Underwater Vehicle*, OCEANS 2009, MTS/IEEE Biloxi, pp. 1-8, each incorporated by reference in entirety.

Commercial Remotely Operated Vehicles ("ROVs") and AUV magnetic surveys are also used for undersea pipeline and cable inspections. Research surveys using AUVs in areas of hydrothermal vents and ocean ridges have utilized magnetic data to interpret the nature and geometry of the hydrothermal system beneath the seafloor. See Tivey, *The Magnetic Signature of Hydrothermal Systems in Slow Spreading Environments*, in Diversity of Hydrothermal Systems on Slow Spreading Ocean Ridges, Geophys. Monogr. Ser., vol. 188, edited by P. A. Rona et al., 440 pp., AGU, Washington, D.C., doi:10.1029/2008GM000773, 2010, and Honsho, *Deep-sea magnetic vector anomalies over the Hakurei hydrothermal field and the Bayonnaise knoll caldera, Izu-Ogasawara arc, Japan*, Journal of Geophysical Research: Solid Earth, v. 118, doi:10.1002/jgrb.50382, 2013, each incorporated by reference in entirety.

However, typically magnetic data is not collected during regular AUV and ROV operations, even when these vehicles are being used for mineral exploration. There are a number of probable reasons.

The teams doing marine mineral exploration are typically hydrographers and geologists, and not normally mineral exploration geophysicists familiar with magnetic data processing and interpretation. As well, magnetometers are sold as a piece of gear FOB factory, so the training necessary to operate the magnetometer, collect, process and interpret the data must be acquired elsewhere. Consequently, a survey including the use of a magnetometer will typically require a specialist added to the survey crew. Additionally, the survey information with the xyz position and attitude of the magnetometer is normally collected separately and needs to be merged with the raw magnetometer data prior to processing.

However, probably the largest reason for not collecting magnetic data during AUV mapping surveys are the magnetic fields produced by the AUV obscure the geological information in maps of the raw magnetic data. The fields produced by a vehicle can be quite large, corrupting and perhaps overwhelming the ambient magnetic field generated by the local geological environment, and are attitude and heading dependent. Proton precession or Overhauser effect magnetometers simply do not work within the high magnetic gradients present within the body of the AUV. Degaussing of the AUV is one way of removing static magnetic vehicle fields but is difficult and will eventually wear off. Another solution to mitigate effects of these fields is to mount the magnetometer away from the AUV with specialized mounting apparatus such as a towed body or long poles. However, this comes with the cost of increased complication to operations and risk to vehicle safety.

The other solution is to mount the magnetometer inside the AUV and compensate for the attitude and heading dependent effects. This requires compensation not only for the attitude of the AUV in the earth's field, but also for secondary effects related to the strength of the electric currents flowing in the vehicle propulsion and control circuits.

However, other than during specialized commercial, military, and academic surveys, magnetic data is not normally collected on autonomous underwater vehicles (AUVs) and remotely operated vehicles (ROVs) conducting geological mapping and hydrographic survey operations.

One reason for this is the magnetic field produced by the local geology is often overwhelmed by the heading and attitude dependent magnetic fields of the vehicle when the magnetometer is mounted close to or inside the AUV. Magnetometers can be mounted away from the AUV with specialized mounting apparatus e.g. a towed body or pole-mounts, but at the cost of increased complication to operations and risk to vehicle safety. To produce useful data from a magnetometer mounted inside the body of an AUV, it is necessary to compensate not only for the attitude of the AUV in the earth's field, but also for secondary effects related to the strength of the electric currents flowing in the vehicle propulsion and vehicle control circuits.

Traditional devices and methods to address magnetic compensation are limited. For example, U.S. Patent Appl. Publication No. 2008/0125920 to Miles et al., discloses an un-manned airborne vehicle (UAV), for acquiring aeromagnetic data for geophysical surveying at low altitude on land or over water, comprising an extended fuselage that is adapted to hold and maintain magnetometer and a magnetic compensation magnetometer at a minimum distance from the avionics and propulsion systems of the UAV. The magnetometer measures magnetic anomalies and the magnetic compensation magnetometer measures magnetic responses corresponding to the pitch, yaw and roll of the UAV. A data acquisition system stores and removes the magnetic response measurements from the magnetic anomaly measurements. The data acquisition system also stores a survey flight plan and transmits the same to the avionics system. The generator of the UAV is shielded and the propulsion system is stabilized to reduce magnetic and vibrational noises that can interfere with the operation of the magnetometer. Miles does not, for example, disclose a system and method for compensation of magnetic data as collected during autonomous underwater vehicle mapping surveys that does not require the data to be placed in a geographic frame of reference prior to correction terms to be calculated, and which comprises a correction for variable thruster motor currents. Miles is incorporated by reference in its entirety.

U.S. Patent Appl. Publication No. 2014/0152455 to Giori et al., discloses a first object, an autonomous underwater vehicle equipped for the acquisition of the gravimetric and magnetic gradient near the seabed, characterized in that it comprises gravimetric gradiometer and a magnetic gradiometer. In particular, said autonomous equipped underwater vehicle allows underwater explorations as far as 3,000 m. Giori does not, for example, disclose a system and method for compensation of magnetic data as collected during autonomous underwater vehicle mapping surveys that does not require the data to be placed in a geographic frame of reference prior to correction terms to be calculated, and which comprises a correction for variable thruster motor currents. Giori is incorporated by reference in its entirety.

U.S. Pat. No. 8,378,671 to Mahoney discloses cost-effective compact magnetometers which can be deployed across large ocean areas to record magnetic field strengths. Each magnetometer has a canister containing a magnetometer sensor at its upper end to detect magnetic field strengths of magnetic influence sweep systems and provide representative data signals. Each magnetometer also has sensors to collect data representative of the orientation of the magnetometer as well as temperature and depth to aid in post operational evaluation of the gathered magnetic strength data. A computer processor connected to the sensors controls receipt of the data signals and stores them in a memory device. Batteries at the canister's lower end supply power for the sensors, processor, and memory. An anchor release mechanism causes an anchor to separate from the canister, allowing it to float to the surface for recovery or to transmit data via a UHF transceiver. Mahoney does not, for example, disclose a system and method for compensation of magnetic data as collected during autonomous underwater vehicle mapping surveys that does not require the data to be placed in a geographic frame of reference prior to correction terms to be calculated, and which comprises a correction for variable thruster motor currents. Mahoney is incorporated by reference in its entirety.

U.S. Pat. No. 4,995,165 to Daniels discloses a roll-independent magnetometer which may be used in a towed array magnetometer system comprises a first magnetic field sensor having iso-angular flux sensitivity about a roll axis and a second magnetic field sensor having sensitivity along the roll axis, the arrangement being such that a component of a magnetic field along the roll axis is measured by the second unidirectional sensor and the component of the field lateral to the roll axis is measured by the first sensor. Corrections may be applied for the inclination of the sensor and the angle of dip of the Earth's field. The angle of dip may be measured either in the towing vessel, in the towed body, or provided in look-up tabulated form. Daniels does not, for example, disclose a system and method for compensation of magnetic data as collected during autonomous underwater vehicle mapping surveys that does not require the data to be placed in a geographic frame of reference prior to correction terms to be calculated, and which comprises a correction for variable thruster motor currents. Daniels is incorporated by reference in its entirety.

U.S. Pat. No. 4,109,199 to Ball discloses a three axis magnetometer with a single calibration checking coil lying in a plane disposed at equal angles to each of the three orthogonal axes of sensitivity. Energization of the calibration checking coil with a known current while the calibrated magnetometer is in a known condition of calibration provides sensitivity readings for each of the three axes, which readings provide a standard of comparison for checking the calibration and sensitivity of the magnetometer by similar energization of the coil when the magnetometer is disposed in a remote operational environment. Ball does not, for example, disclose a system and method for compensation of magnetic data as collected during autonomous underwater vehicle mapping surveys that does not require the data to be placed in a geographic frame of reference prior to correction terms to be calculated, and which comprises a correction for variable thruster motor currents. Ball is incorporated by reference in its entirety.

By way of providing additional background, context, and to further satisfy the written description requirements of 35 U.S.C. § 112, the following references are incorporated by reference in their entireties: U.S. Patent Appl. Publication No. 2014/0165898 to Cierpka; WO 2012/068362 to Sheng; U.S. Patent Appl. Publication No. 2011/0010095 to Dyer; U.S. Patent Appl. Publication No. 2013/0239869 to Hesse; U.S. Pat. No. 6,765,383 to Barringer; Wo 1999/050619 to Ceccherini; and U.S. Pat. No. 8,148,992 to Kowalczyk.

Thus, there is a long-felt need for a system and method compensating the magnetic data for the vehicle related fields. This method includes both a physical calibration procedure and a mathematical treatment of the data. This calibration procedure may be performed prior to every survey, and therefore, the addition or subtraction of equipment between launches will not affect final results. Experimental results are disclosed derived from a case study in an area of seafloor hydrothermal venting that shows applying these correction terms to the raw magnetic data produces very useful magnetic maps for the subsurface geology in a survey area.

SUMMARY

In one embodiment of the invention, to calculate compensation terms, both a physical calibration routine and a mathematical treatment of the data are performed. Prior to each survey, flying a short calibration maneuver enables the calculation of correction terms to the raw magnetic data. The calibration maneuver consists of two sequential, coincidental squares of four calibration legs per square. These squares are flown in opposite directions with the sides of the squares aligned parallel with the primary survey and tie lines. The AUV is typically flown in terrain following (constant altitude) mode at the nominal altitude of the survey, but is changed during each leg to induce pitch into the flight of the AUV. The vehicle may also be flown in a manner that induces roll in the flight of the AUV. Correction terms are then calculated from the calibration magnetic field data. Additional data information may be extracted from then AUV attitude. Note that the attitude and vehicle control data are useful but not essential to the method. Note further that heading is a reference to the vehicle in the geographic frame of reference, also not a required parameter to the method. Applying these correction terms to the raw magnetic data collected during the survey produces very useful magnetic maps for interpreting regional, subsurface geology in the survey area.

In one embodiment, a method for magnetic data compensation is disclosed, the method comprising: providing at least one magnetometer mounted on a subsea vehicle; maneuvering the subsea vehicle at a first altitude above the seafloor and a first heading; receiving, by a microprocessor, a first set of raw output from the magnetometer; receiving, by a microprocessor, subsea vehicle state data and subsea vehicle performance data concurrently with the receiving of the first set of raw magnetic data; and processing, by a microprocessor, the subsea vehicle state data, the subsea vehicle performance data, and the first set of raw magnetic data to produce magnetic compensation coefficients.

Vehicle state data may include but is not limited to, vehicle roll, vehicle pitch, vehicle yaw, motor currents, control system currents, control plane positions, motor states, auxiliary sensor states and currents.

In another embodiment, a method to produce compensated magnetic underwater survey data is disclosed, the method comprising: providing at least one magnetometer mounted on a subsea vehicle; maneuvering the subsea vehicle at a first altitude above the seafloor and a first heading, and at a second altitude above the seafloor at a heading 180 degrees from the first heading; receiving, by a microprocessor, a first set of raw output from the magnetometer; receiving, by a microprocessor, subsea vehicle state data and subsea vehicle performance data concurrently with the receiving of the first set of raw magnetic data; processing, by a microprocessor, the subsea vehicle state data, the subsea vehicle performance data, and the first set of raw magnetic data to produce magnetic compensation coefficients; performing a subsea mapping and receiving a second set of raw magnetic data output from the magnetometer while performing the subsea mapping; and applying, by a microprocessor, the magnetic compensation coefficients to the second set of raw magnetic data to produce compensated magnetic survey data which does not reference the Earth's geodetic frame of reference; wherein the subsea vehicle performance data comprises variable thruster motor currents; wherein the subsea vehicle state data comprises depth and altitude above the seafloor.

In yet another embodiment, a system to produce compensated magnetic underwater survey data is disclosed, the system comprising: at least one magnetometer configured to mount to a subsea vehicle; a memory; a processor in communication with the memory, the processor operable to: receive a first set of raw output from the magnetometer; receive subsea vehicle state data and subsea vehicle performance data concurrently with the receiving of the first set of raw magnetic data; processing the subsea vehicle state data, the subsea vehicle performance data, and the first set of raw magnetic data to produce magnetic compensation coefficients; receiving a second set of raw magnetic data output from the magnetometer while performing the subsea mapping; applying the magnetic compensation coefficients to the second set of raw magnetic data to produce compensated magnetic survey data; wherein the first set of state data is collected while the subsea vehicle maneuvers at a first altitude above the seafloor and a first heading; wherein the second set of raw magnetic data is collected while the subsea vehicle is performing a subsea mapping.

In some embodiments, the system and/or method disclosed comprises a tangible and non-transient computer readable medium comprising microprocessor executable instructions that, when executed, perform the receiving and processing steps disclosed.

In some embodiments, the system and/or method disclosed further comprises: wherein the produced compensated magnetic data references a frame of reference comprising the magnetometer and the subsea vehicle; wherein the processing is independent of an ambient magnetic field; wherein the produced compensated magnetic data does not reference the Earth's geodetic frame of reference; performing a subsea mapping and receiving a second set of raw magnetic data output from the magnetometer while performing the subsea mapping; applying the magnetic compensation coefficients to the second set of raw magnetic data to produce compensated magnetic survey data; maneuvering the subsea vehicle at a second altitude above the seafloor at the first heading; maneuvering the subsea vehicle at a second altitude above the seafloor, wherein the subsea mapping is performed at a survey altitude above the seafloor, the survey altitude between and including the first altitude and the second altitude; maneuvering the subsea vehicle at a second altitude above the seafloor at a second heading; maneuvering the subsea vehicle at a first altitude above the seafloor at a heading 180 degrees from the first heading; wherein the maneuvering step comprises tracing a rectangular seafloor heading track; wherein the subsea vehicle state data comprises depth and altitude above the seafloor; wherein the subsea vehicle performance data comprises variable thruster motor currents; and wherein the subsea vehicle comprises an ROV and an AUV.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "communication channel" refers to an analog and/or digital physical transmission medium such as cable (twisted-pair wire, cable, and fiber-optic cable) and/or other wireline transmission medium, and/or a logical and/or virtual connection over a multiplexed medium, such microwave, satellite, radio, infrared, or other wireless transmission medium. A communication channel is used to convey an information signal, for example a digital bit stream, from one or several senders (or transmitters) to one or several receivers. A communication channel has a certain capacity for transmitting information, often measured by its bandwidth in Hz or its data rate in bits per second. Communication channel performance measures that can be employed in determining a quality or grade of service of a selected channel include spectral bandwidth in Hertz, symbol rate in baud, pulses/s or symbols/s, digital bandwidth bit/s measures (e.g., gross bit rate (signaling rate), net bit rate (information rate), channel capacity, and maximum throughput), channel utilization, link spectral efficiency, signal-to-noise ratio measures (e.g., signal-to-interference ratio, Eb/No, and carrier-to-interference ratio in decibel), bit-error rate (BER), packet-error rate (PER), latency in seconds, propagation time, transmission time, and delay jitter.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "display" refers to a portion of a screen used to display the output of a computer to a user.

The terms "determine", "calculate" and "compute," and variations thereof, as used herein, are used interchangeably and include any type of methodology, process, mathematical operation or technique.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "module" as used herein refers to any known or later developed hardware, software, firmware, artificial intelligence, fuzzy logic, or combination of hardware and software that is capable of performing the functionality associated with that element.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

It should be understood that the drawings are not necessarily to scale, unless indicated otherwise. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Reference No. | Component |
| --- | --- |
| 100 | Magnetic Compensation System |
| 110 | Magnetometer |
| 111 | Magnetometer Input |
| 112 | Raw Magnetometer Output |
| 130 | Subsea Vehicle Controller |
| 132 | Subsea Vehicle Controller Output |
| 133 | Subsea Vehicle Controller Input |
| 140 | Subsea Vehicle |
| 142 | Subsea Vehicle State Data |
| 150 | PCM Profile |
| 152 | PCM Profile Output One |
| 153 | PCM Profile Query One |
| 154 | PCM Profile Output Two |
| 155 | PCM Profile Query Two |
| 160 | Magnetic Compensation Algorithms |
| 162 | Compensated Magnetic Survey Data Output |

DETAILED DESCRIPTION

Seafloor Hydrothermal Venting

Areas of seafloor hydrothermal venting are of great interest because of their potential as mineral resources with high-grades of valuable metals such as copper, zinc, gold, and other polymetallic sulfides. Magnetic anomaly maps over these sites have characteristic signatures and can provide information on the subsurface structure of hydrothermal systems. Typically, hydrothermal alteration in the feeder systems below the vents results in the destruction of magnetic minerals and consequently produces areas of reduced magnetization. In some cases, hydrothermal activity leads to enhanced magnetization by the deposition of magnetite in the mineralized zone or serpentization of host rocks at plate boundaries.

The lateral scale of the venting sites and associated alteration zones is small, often no greater than a couple of hundreds of meters and much less than the water depths at many of these sites. Consequently, to properly map these small scale magnetic structures, ship based surveys are inadequate, and mapping near the seafloor with subsurface vehicles is required. In conjunction with standard high-resolution AUV multibeam, sidescan, and subbottom surveys over these areas, the collection of magnetic data adds considerable value to mineral exploration programs with little extra cost. See Kowalczyk, *Geophysical prelude to first exploitation of submarine massive sulphides*", First Break, vol. 26, no. 11, 2008, incorporated by reference in entirety.

Magnetic Compensation System

Figure 1:
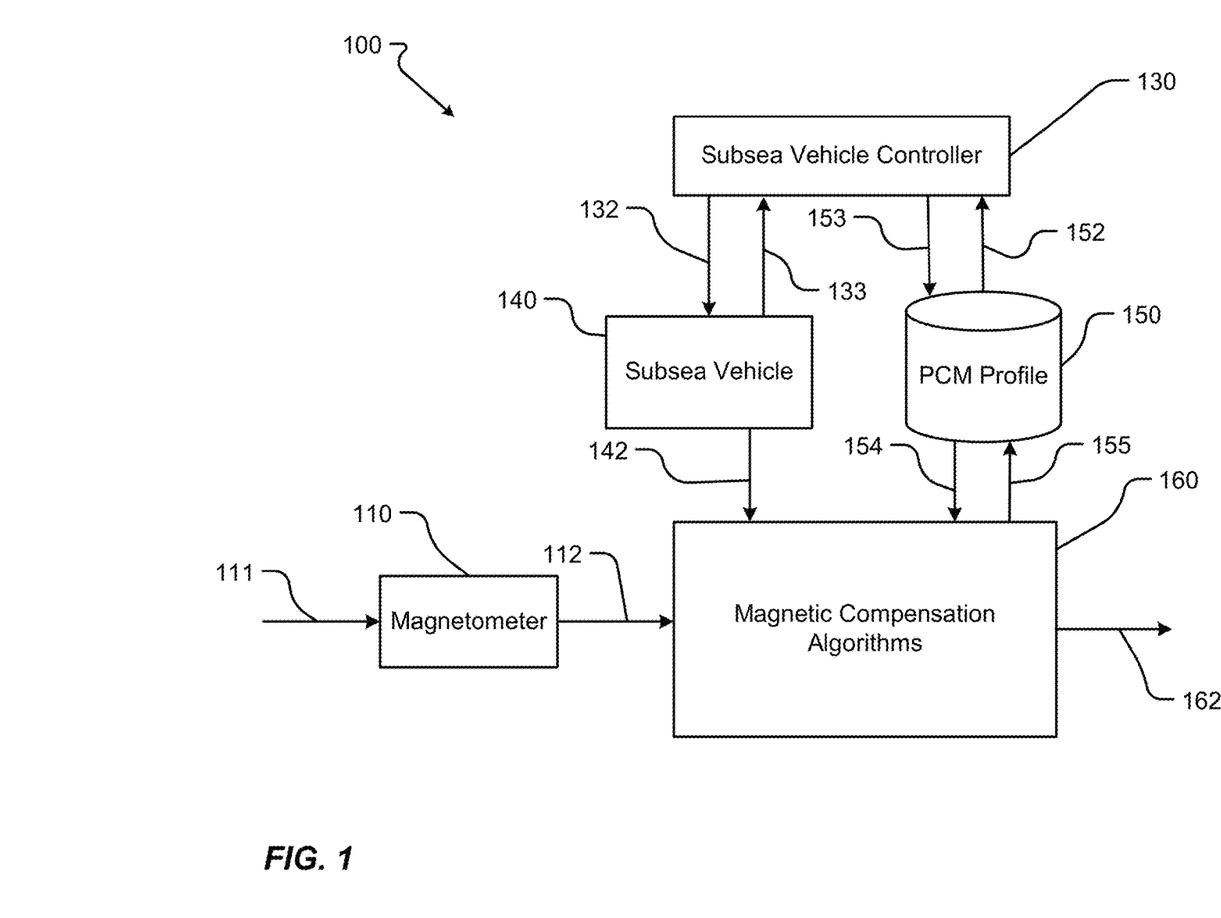
FIG. 1 depicts a block diagram of the magnetic data compensation system, according to one embodiment of the invention.

FIG. 1 depicts a block diagram of the magnetic compensation system 100, according to one embodiment of the invention. The system 100 comprises magnetometer 110, magnetic compensation algorithm 160, Physical Compensation Maneuver (PCM) Profile 150, subsea vehicle controller 130 and subsea vehicle 140.

Magnetometer 110 may be any magnetometer known to those skilled in the art, to include, for example, the magnetometer detailed below in the Experimental portion of the disclosure. The magnetometer is mounted to the subsea vehicle 140, for example, in the nose cone portion of an AUV, or outboard and extended/high on an ROV. Note that while ROV mounting outboard and high results in reduced to minimal magnetic interference from the ROV, the magnetometer is more susceptible to collision or breakage. The magnetometer 110 senses or measures the magnetic field vector (i.e. magnetometer input 111), that is, the three-dimensional magnetic field, and the total magnetic field strength. These values are termed "raw" magnetic field measurements in that they are not, for example, compensated for local induced effects, such as magnetic fields generated by the subsea vehicle 140. The raw magnetic field measurements and associated time stamps are output as raw magnetometer output 112.

Subsea vehicle 140 is controlled by subsea vehicle controller 130. In some embodiments, subsea vehicle controller 130 is located on a surface ship, such as when the subsea vehicle is a tethered ROV or an AUV that has capabilities to communicate to the subsea vehicle controller 130 located on a surface ship. In other embodiments, the subsea vehicle controller 130 is located within the subsea vehicle 140, such as when the subsea vehicle is an AUV. The subsea vehicle 140 may have any design suitable for the specific underwater application, to include underwater mapping or surveying. The subsea vehicle 140 may have on-board intelligence, making it partly or fully automated. Subsea vehicle controller 130 controls subsea vehicle 130 by providing or sending or transmitting subsea vehicle controller output 132 to subsea vehicle 140. Such signals from the controller to the vehicle may include, for example, an altitude above sea level command, or a heading change. Subsea vehicle 140 receives subsea vehicle controller output 132 and transmits or sends or provides subsea vehicle controller input 133 to subsea vehicle controller 130. Such signals from the vehicle to the controller may include, for example, vehicle state information (such as vehicle altitude above sea floor, depth, position of diving planes, heading, pitch, roll, and yaw, engine power levels such as electrical power level). Vehicle state data is time-stamped. Subsea vehicle controller 130 and subsea vehicle 140 form a closed-loop control system.

PCM Profile 150 stores and maintains PCM profiles. For example, a first profile may comprise a sequence of two square flight patterns wherein square one is flown in a clockwise direction and square two is flown in a counterclockwise direction. A second profile may be identical to the first profile except at a different altitude and/or depth. A third profile may be similar to the second profile except include variable altitudes above the seafloor. The PCM profiles stored and/or created in the PCM Profile 150 may be selectable by a user or operator of the subsea vehicle controller 130 by way of PCM profile query one 153 and the selected PCM profile may be received by subsea vehicle controller 130 via PCM profile query two 152.

Magnetic compensation algorithms 160 computes magnetic compensation coefficients which may be applied to raw magnetic data to account for local magnetic fields. The removal or accounting or compensation of such local effects (such as caused or induced by subsea vehicle components, materials, motions, electrical power) with respect to the raw magnetic field data enables greater clarity of subsea magnetic mappings or surveys (as evident in FIGS. 5A-C as discussed below). The magnetic compensation algorithms 160 element receives inputs comprising raw magnetometer input 112, and subsea vehicle state data 142. In a first mode of operation, magnetic compensation algorithms 160 element computes or determines magnetic compensation coefficients based on raw magnetometer output 112 and subsea vehicle state data 142, as generated during the subsea vehicle 140 flying a selected PCM profile 150 (as identified by PCM profile output two 154 received by magnetic compensation algorithm 160 and/or through query of PCM profile 150 via PCM profile query two 155). In a second mode of operation, the magnetic compensation algorithms 160 element applies the magnetic compensation coefficients, as determined in mode one operation, to a received set of raw magnetometer output 112 data (as generated during a survey or mapping operation) to generate a set of compensated magnetic (survey or mapping) data.

Subsea vehicle state data 142 may comprise any status or measurement of the vehicle state, to include vehicle altitude above sea floor, vehicle depth, position of vehicle diving planes or other control surfaces of the subsea vehicle, heading, pitch, roll, and yaw, engine/thruster power level such as electrical power level and/or battery draw, operational conditions such as on/off and power levels of other sensors or equipment on the subsea vehicle such as sonars, conductivity probes, INUs or other navigational aids, and thermistors. Some vehicle state parameters include both state setting and measure state; for example, engine propeller RPM setting in addition to a measured value of engine propeller RPM.

Magnetic compensation algorithms 160 element may be physically located on the subsea vehicle 140, on a surface vessel, or a combination thereof. For example, the inputs (i.e. 112, 142 and/or 154) to the magnetic compensation algorithms 160 element may be recorded on a device on the subsea vehicle, and the remaining functions of the magnetic compensation algorithms 160 element performed on the surface vessel. Alternatively, all inputs (i.e. 112, 142 and/or 154) to the magnetic compensation algorithms 160 element may be communicated (via umbilical cord for an ROV, for example, or wirelessly for an AUV) to a surface ship where all functions and computations of the magnetic compensation algorithms 160 element occur. All mode 1 and/or mode 2 functions of the magnetic compensation algorithms 160 element may, in some embodiments, be performed on the subsea vessel 140, in real-time, near real-time, and/or in a batch or post-process manner.

Magnetic Compensation Maneuver

A magnetic compensation maneuver, i.e. "physical compensation maneuver (PCM)" is performed to collect data that enables the computation of magnetic compensation coefficients by the magnetic compensation algorithms 160 element. The compensation is necessary to remove the effects of the magnetic field of the subsea vehicle 140 and to remove the effects of the subsea vehicle's interaction with the Earth's magnetic field. The magnetic compensation algorithms 160, as described below, do not require the data to be placed in a geographic frame of reference prior to calculation of the magnetic correction terms, and furthermore may include a correction for variable thruster motor currents. In the PCM procedure, a calibration maneuver is performed prior to the main survey or mapping, changing both the heading and altitude during the course of the maneuver. It is useful, but not necessary, that the maneuver be done in an area of low magnetic gradients.

In one embodiment of the PCM, the maneuver is performed as two sequential, coincident squares, creating a set of reciprocal lines. The first square is flown in an anti-clockwise direction; the second square is flown clockwise. See FIGS. 2A and 2B. There is a small turning maneuver between the two squares to align the AUV for entry to the second square. The sides of the squares may be aligned parallel with the primary survey and tie lines.

Figure 2A:
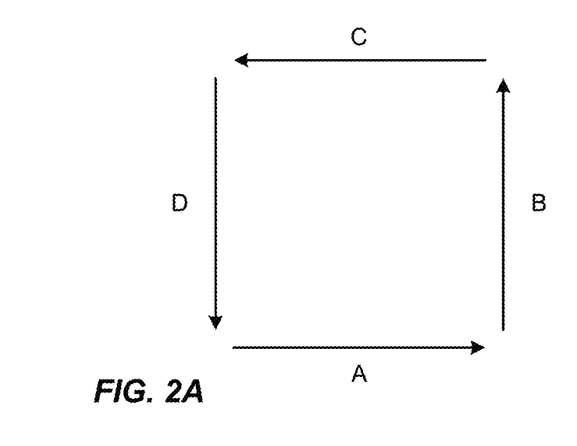
FIG. 2A depicts a top-level view of a first portion of a physical compensation maneuver, a step of the magnetic data compensation system of FIG. 1.
Figure 2B:
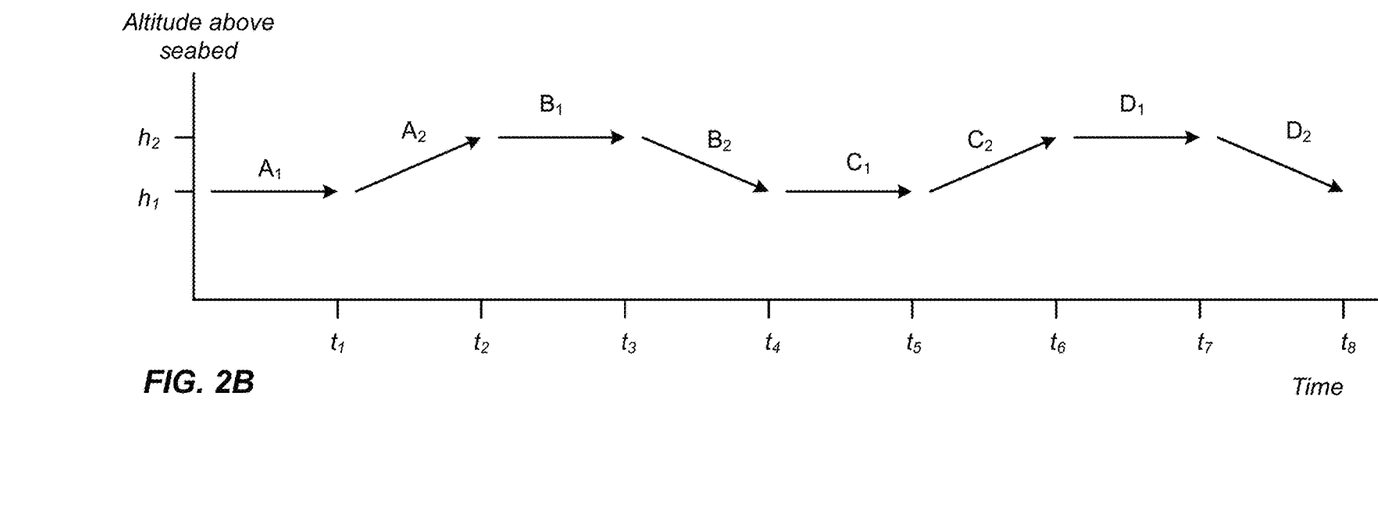
FIG. 2B depicts a side-elevation view of the first portion of a physical compensation maneuver of FIG. 2A.

FIGS. 2A and 2B depict a top-level and side-elevation view, respectively, of the first square portion of a PCM comprising legs A-D. In the first leg, that is, leg A, the subsea vehicle 140 flys at a first course heading (90 degrees heading) in two segments, $A_1$ and $A_2$. In segment $A_1$, the subsea vehicle 140 flys at a first heading and an altitude above sea level $h_1$. At time $t_1$ segment $A_2$ is entered: the subsea vehicle 140 pitches upwards, while maintaining the first heading, to rise to at a second altitude $h_2$. Second altitude $h_2$ is reached at time $t_2$. At time $t_2$, subsea vehicle turns 90 degrees clockwise to heading two (a heading of 0 degrees), to fly leg B comprising two segments of $B_1$ and $B_2$. Segment $B_1$ is flown at heading two and altitude $h_2$ until time $t_3$, upon which the subsea vehicle 140 begins segment $B_2$ and pitches downwards to reach altitude $h_1$ at time $t_4$. At $t_4$ the subsea vehicle 140 turns counterclockwise to heading three (a heading of 270 degree) and enters the third leg. The third leg is leg C comprising segment $C_1$ and $C_2$. Segment C1 begins at altitude $h_1$ until time $t_5$ is reached, when subsea vehicle 140 pitches upwards to reach altitude $h_2$ at time $t_6$. At t6, the subsea vehicle 140 turns to heading four (180 degrees) to begin final leg D of the first square portion of the PCM. Leg D comprises segment $D_1$ and $D_2$. Segment $D_1$ is flown at an altitude $h_2$ until time $t_7$, when the subsea vehicle 140 pitches down to reach altitude $h_1$ at time $t_8$, thereby returning to the location of the start of the first square portion of the PCM.

Figure 2C:
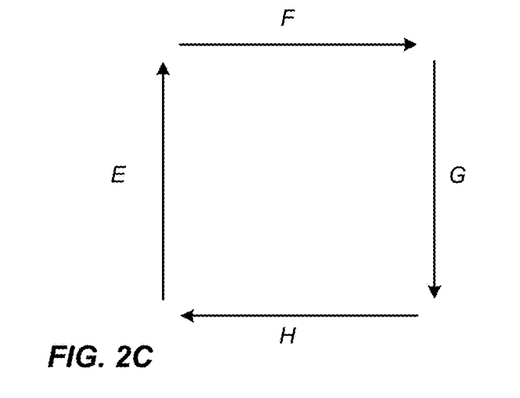
FIG. 2C depicts a top-level view of a second portion of a physical compensation maneuver, a step of the magnetic data compensation system of FIG. 1.
Figure 2D:
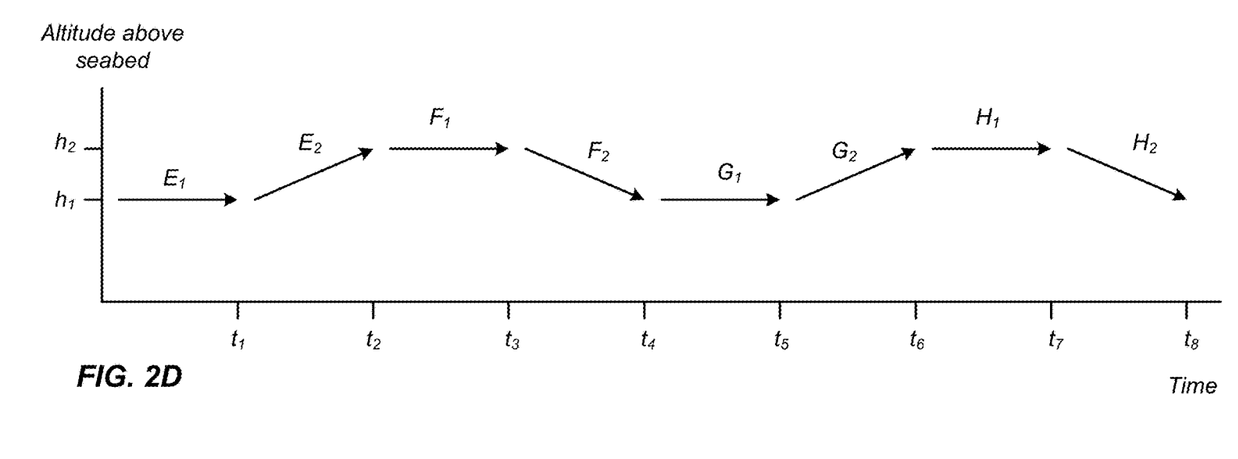
FIG. 2D depicts a side-elevation view of the second portion of a physical compensation maneuver of FIG. 2C.

After completing the first (counter-clockwise) square of the PCM, the subsea vehicle 140 flys the identical trajectory in a clockwise direction. FIGS. 2C and 2D depict a top-level and side-elevation view, respectively, of the square portion of a PCM comprising legs E-H. To enter first leg E, the subsea vehicle 140 makes a 180 degree turn (either clockwise or counter-clockwise).

The PCM depicted in FIGS. 2A-D is a planned and thus idealized trajectory, and is an example of a PCM profile 150 as discussed above with reference to FIG. 1. The actual trajectory flown by a subsea vehicle 140 will never exactly follow the trajectory depicted, due to several factors, such as vehicle kinematics, underwater currents, etc. An actual PCM flown is shown in FIG. 4B, with reference to scheduled PCM profile of FIG. 4A.

The PCM of FIGS. 2A-D is an exemplar PCM; many other profiles are possible and form other embodiments. For example, the paired segments of a particular leg may form a constant altitude, or a constant ascent i.e. a constant pitch up, or include a combination of one or more ascents and descents. Generally, any recorded trajectory that reaches steady state (with regard to the recorded parameters as identified above) may serve as a PCM.

In one embodiment, the PCM is comprised of a repeated rectangular loop flown in opposite directions (i.e. clockwise and counter clockwise). In alternate embodiments, the PCM is comprised of a repeated non-rectangular loops flown in opposite directions (i.e. clockwise and counter clockwise), such as a triangle.

The magnetic field compensation maneuver (i.e. the PCM) may be performed near the subsea surface and may be incorporated as part of the normal required inertial navigation system (INS) compensation corrections procedure needed for AUV navigation. Such a capability or feature is unlike conventional magnetic compensation calculations performed with data acquired distant from the sea floor and in regions of low magnetic gradients. Also, such a feature is important for water depths greater than 300 m as the time required to perform magnetic compensation maneuvers in mid water (away from the bottom) results in a degradation of the quality of the navigation information provided by the INS to accurately position the vehicle. Thus, performing the physical compensation maneuver (PCM) close to the sea bottom improves the quality of the navigation information from the vehicle INS.

In one embodiment, the PCM heading lines are aligned approximately in the same headings as the magnetic survey lines with intentional changes in pitch to two primary altitudes to form a V-shape pattern in the vertical plane on each line.

Magnetic Compensation System Method of Use

Figure 3:
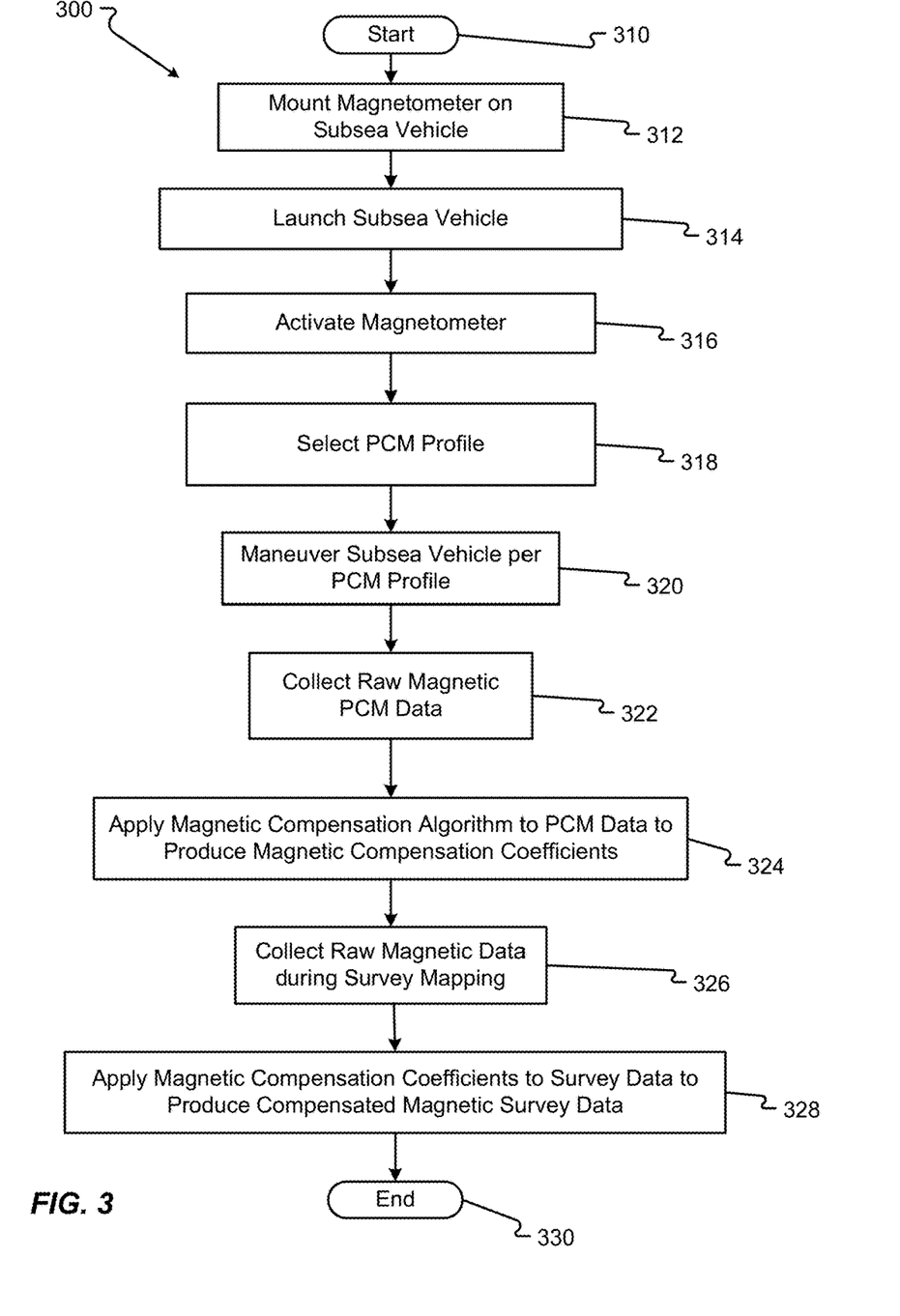
FIG. 3 is a flow-chart of one method of use of the magnetic data compensation system, using the embodiment of the magnetic data compensation system of FIG. 1.

FIG. 3 is a flowchart of a general order of one method 300 of use of the magnetic data compensation system, using the embodiment of the magnetic data compensation system of FIG. 1. The method will be described with reference to FIGS. 1-2. The method starts with Step 310 and ends with Step 330. The method 300 can include more or fewer steps or can arrange the order of the steps differently than those shown in FIG. 3.

At step 312, magnetometer 110 is mounted on or in subsea vehicle 140. The magnetometer may be mounted to the subsea vehicle 140, for example, in the nose cone portion of an AUV, or outboard and high on an ROV. In one embodiment, the mounting of the magnetometer 110 involves use of a 3-axis fluxgate magnetometer, as available on smartphones. In one such embodiment, if an application on a smartphone allows the regional magnetic field bias to be removed, then the smartphone may readily be used to check for high magnetic gradients and nearby magnetic objects.

At step 314 the subsea vehicle 140 is launched. The subsea vehicle 140 may be controlled by subsea vehicle controller 130 in manners comprising: a fully automatic manner (e.g. as an AUV), manually by an operator on a surface vessel, and semi-autonomous manners know to those skilled in the art.

At step 316, the magnetometer 110 is activated. Any routine calibration and input/output signal checks are also performed.

At step 318, a PCM trajectory from PCM profile 150 is selected. The selected PCM may comprise a set of trajectories as discussed above with respect to FIGS. 2A-D.

At step 320, the subsea vehicle 140 flies the trajectory as identified or characterized by the selected PCM profile. The subsea vehicle 140 flys the trajectory through control commands issued by the subsea vehicle controller 130 by way of subsea vehicle controller output 132.

At step 322, raw magnetometer measurements are collected, comprising 3-dimensional vector components of magnetic field and total magnetic field strength. The measurements are time-stamped and associated with subsea vehicle state data 142. For example, a given set of raw magnetometer readings collected at a time $t_{mag}$ would be associated with subsea vehicle 140 electrical power level or output collected at the same time $t_{mag}$ (if collected synchronously). The raw magnetometer output 112 data is output from step 322 and sent to step 324.

At step 324, the magnetic compensation algorithm 160 (in mode one as discussed above) is applied to the collected raw magnetometer output 112 data as collected in step 322. The magnetic compensation algorithm 160 assesses and processes the raw magnetometer output 112 data, as collected during a PCM profile, with the subsea vehicle state data 142 to generate magnetic compensation coefficients. Continuing the example of step 322, the set of raw magnetometer readings collected and associated with subsea vehicle state data 142 (for example, subsea vehicle 140 electrical power level) are processed to enable compensation or correction for the local effect of the vehicle's induced magnetic field generated by the vehicle's electrical system.

In one embodiment, three component raw magnetic data (i.e. magnetometer output 112) are merged in a file with the relevant subsea vehicle state data 142 using nearest neighbor interpolation. These data may include navigation, AUV depth, altitude, pitch, roll, heading, and vehicle thruster (electrical) current. Correction coefficients are calculated to determine: 1) the three components for the magnetization of the vehicle; 2) the secondary fields produced by the interaction of the AUV with the Earth's magnetic field; and 3) the variable magnetic field of the AUV's motors likely in response to variable bottom currents from the subset of data collected during the calibration maneuver. It is particularly important to utilize the thruster current data by adding correction terms for the variable magnetic field produced by the Asubsea vehicle's motors. The process may not include directly the heading, pitch, and roll, but visual confirmation may be made that the residual magnetic field after correction is independent of these variables. Once these correction coefficients have been estimated, they are applied to the survey data and contour maps of the gridded residual data are produced.

In one embodiment, the magnetic compensation algorithm 160 calculates compensation coefficients in three parts by accounting for the following: 1) permanent field of the system's magnetic or ferric material (subsea vehicle parts and instrumentation of other surveys mounted on board); compensation coefficients are derived from the physical compensation maneuver (PCM); 2) induced magnetic fields of the system due to heading or motion effects; compensation coefficients are derived from the physical compensation maneuver; and 3) time Variable magnetic fields such as those due to electric motors and electric currents from the battery source; compensation coefficients can be derived at any time from the survey data as the survey proceeds.

In one embodiment, the magnetic compensation algorithm 160 is a 12 term magnetic compensation formulae. In one embodiment, the magnetic compensation algorithm 160 is a 52 term magnetic compensation formulae.

At step 326, raw magnetometer output 112 data is collected during a survey and/or mapping mission. These data are then provided to the magnetic compensation algorithm 160 (in mode two as discussed above) and step 328 is entered.

Figure 5A:
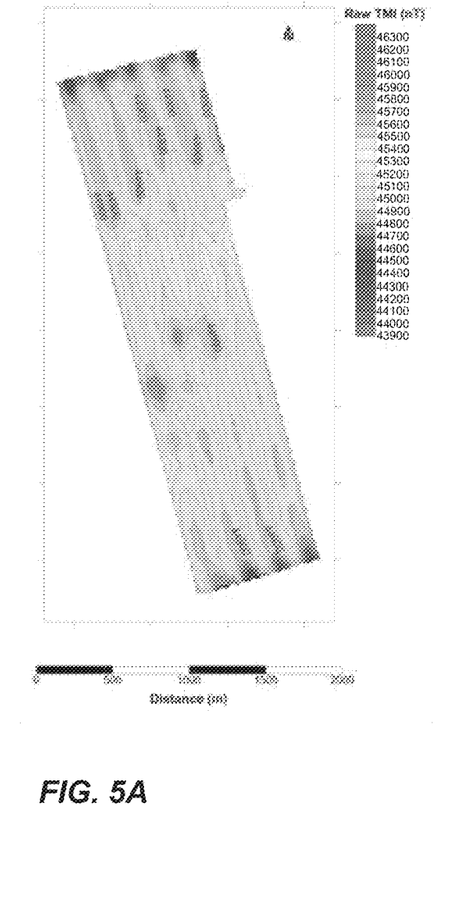
FIG. 5A provides to-scale experimental results using one embodiment of the magnetic data compensation system of FIG. 1, providing a raw total magnetic intensity over a hydrothermal vent site.
Figure 5B:
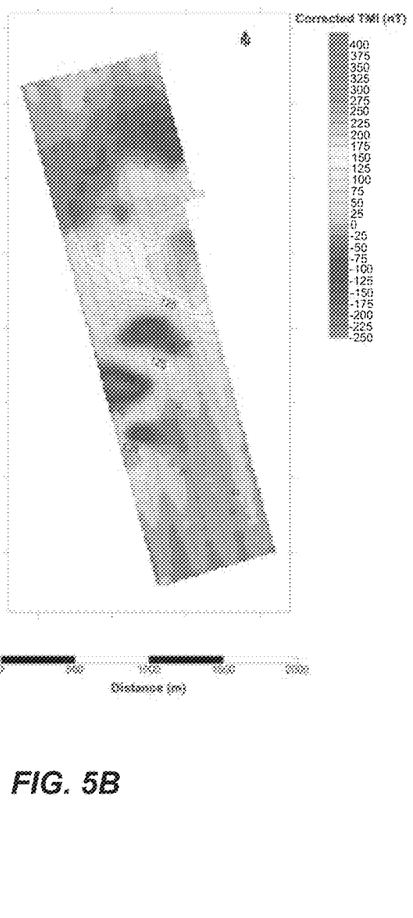
FIG. 5B provides to-scale experimental results with some magnetic corrections using the raw total magnetic intensity data of FIG. 5A.
Figure 5C:
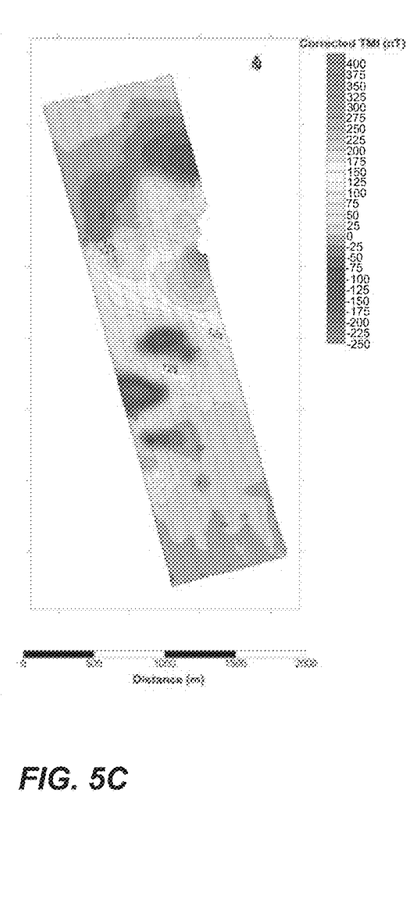
FIG. 5C provides to-scale experimental results of the further magnetic corrections than those of FIG. 5B as applied to the raw total magnetic intensity data of FIG. 5A.

At step 328, the magnetic compensation coefficients, as generated at step 324, are applied to the received raw magnetometer output 112 data obtained at step 326 to produce compensated magnetic survey or mapping data. FIGS. 5A-C depict an experimental use of the magnetic compensation system 100 as applied to magnetic survey data. FIGS. 5A-C are discussed in detail below. The method 300 ends at step 330.

The method 300 provides many unique features for magnetic compensation over the conventional prior art, comprising: 1) the magnetic field compensation is done entirely within the frame of reference of the magnetometer, its system, and subsea vehicle (e.g. AUV) platform; 2) the magnetic field compensation is independent of the ambient magnetic field and accounts for variations of the local magnetic fields of the earth and therefore can be done even in regions of high magnetic gradients; and 3) the magnetic field compensation is independent of the orientation of the AUV platform; knowledge of the AUV attitude in the earth's geodetic frame of reference is not necessary. Stated another way, the system 100 and/or method 300 provides a self-compensating magnetometer system and process that may be mounted and operated on any subsea vehicle that corrects for local magnetic fields induced from subsea vehicle elements comprising components, materials, motions, electrical power, and heading, independent of the earth's magnetic field.

In one embodiment, the method 300 is suitable for the implementation of an automatic algorithm for magnetic surveys that can be implemented routinely on a dive by dive basis on vehicles tasked for other objectives. The automatic compensation algorithm will allow it to be implemented at the start of a dive prior to any magnetometer survey later used for specified tasks that may require real time data processing.

Experimental

A prototype system and method of the type shown in FIGS. 1 and 3 was used for electromagnetic surveys over a copper mineral prospect located at 1700 m depth.

Two magnetometers were used and mounted in the nose cone section of an Explorer Class AUV manufactured by International Submarine Engineering Limited and rated to 3000 m. The magnetometers were placed in this section to be isolated as much as possible from the main propulsion motors of the AUV, but are still close to motors operating the front vehicle planes and the pop-up buoy.

One of the magnetometers is a Model 113D Applied Physics 3-axis fluxgate magnetometer, with a noise level of 2.0 nT. The fluxgate printed circuit board of this unit was housed in a 4000 m rated glass sphere, which is enclosed in an acetyl polymer cylinder. The other magnetometer is a Model 1540 Applied Physics 3-axis fluxgate magnetometer, with a noise level of 0.5 nT. This unit was mounted in a 3000 m rated aluminium cylindrical pressure vessel. For both of these magnetometers, the digital output was a RS232 ASCII sentence with the three orthogonal components of magnetic field ($M_x$, $M_y$, $M_z$) recorded in nT, and the temperature inside the pressure housing used as an indicator of instrument "health".

For this survey, in addition to the magnetic data, multibeam, sidescan sonar, and subbottom profile data were collected. A suite of geochemical sensors that have proven useful for detecting active vent fields during ROV and AUV borne surveys of areas with seabed massive sulphidesas with seabed massive sulphide (SMS) deposits were also provided. Surveys were performed at a nominal altitude of 70 meters, with a line spacing of 100 meters, to guarantee overlapping multibeam coverage over the survey area.

The inertial navigation and vehicle attitude data was recorded on the Vehicle Control Computer (VCC) of the AUV at a rate of 10 Hz. The magnetometer and geochemical sensor data was time-synched with the VCC and recorded separately on an OFG data recorder dedicated to the task. It was also recorded at 10 Hz, but at slightly different times than the navigation and attitude data.

Figure 4A:
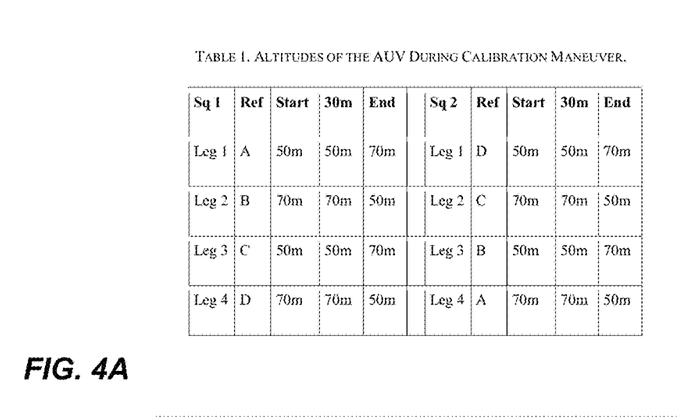
FIG. 4A provides experimental results employing one embodiment of the magnetic data compensation system of FIG. 1, providing a table of altitudes of an AUV during a physical compensation maneuver.
Figure 4B:
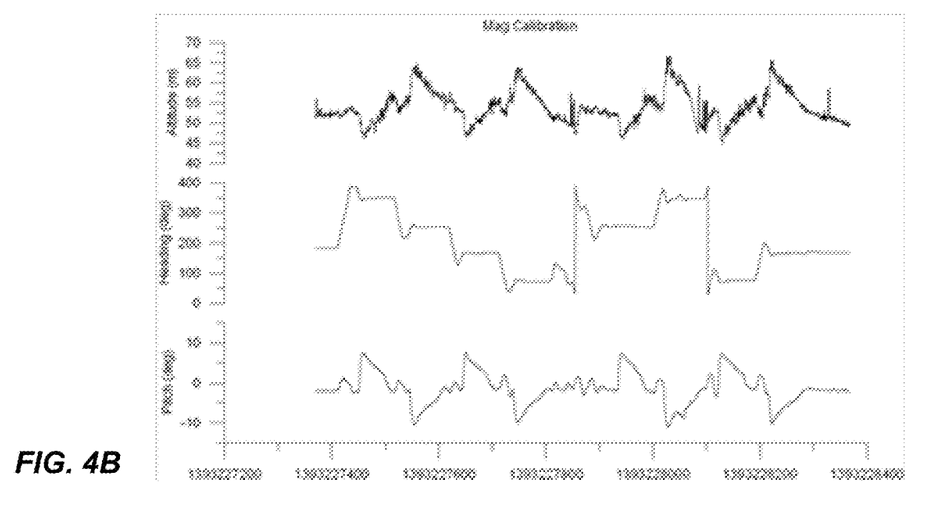
FIG. 4B provides to-scale altitude, heading and pitch of the experimental results employing one embodiment of the magnetic data compensation system of FIG. 4A.

FIG. 4A provides experimental results employing one embodiment of the magnetic data compensation system of FIG. 1, providing a table of altitudes of an AUV during a physical compensation maneuver, and FIG. 4B provides to-scale altitude, heading and pitch of the experimental results employing one embodiment of the magnetic data compensation system of FIG. 4A.

Regarding FIG. 4A, every side of each square represents a calibration leg, thus there are eight legs—two reciprocal legs for each side of the calibration maneuver. Each leg is approximately 130 m in length and takes less than two minutes to fly at 1.5 m/s. The entire calibration takes approximately fifteen minutes to perform.

The AUV is flown in terrain following mode and the calibration maneuver is located over flat ground. The commanded altitude is changed from 50 m to 70 m, the nominal survey altitude, during each leg in order to induce pitch into the flight of the AUV. Each leg starts with level flight for 30 m followed by a commanded change to the new altitude. The AUV attempts to achieve the new altitude before the end of the leg. If it does, it will fly level to the next 30 m inflection point; if it doesn't, it will continue to pursue the target altitude until the next 30 m inflection point. These altitudes are summarized in FIG. 4A.

FIG. 4B shows the result of a calibration maneuver flown North-West-South-East and return; altitude, heading, and pitch during a typical calibration maneuver with time in seconds on the x-axis is provided. Data from the calibration maneuver is then used to calculate correction terms to remove the influence of the AUV on the total magnetic intensity.

Calculating these coefficients in the absence of a maneuver is possible from, for instance, a subset of survey data, but it is made simpler and much more reliable if a magnetic calibration manoeuvre is executed during each dive. It is recommended that a maneuver is performed during each launch because the magnetic fields in the AUV will change from launch to launch.

FIG. 5A shows a contour map of the raw 0.5 nT magnetometer data. The raw Total Magnetic Intensity over a hydrothermal vent site with higher and lower values alternating between adjacent lines is depicted. Note the herring bone pattern that occurs between N-S and S-N running lines. This heading related pattern masks the magnetic field related to geological variation alone. Consequently, a calibration maneuver procedure has been developed to enable the removal of artifacts related to the attitude and heading of the AUV.

FIG. 5B shows residual corrected magnetic intensity map over the same area as FIG. 1 without correction terms for the variable thruster motor related fields applied. Note that in the southern portion of the map that there still remains heading related striping.

FIG. 5C shows the final processed residual magnetic intensity for the same survey area including all three sets of corrections described above (corrections for variable thruster current are included). The heading and pitch related artifacts have mostly been entirely removed using the processing steps described above. Note that the final magnetic intensity map is a residual magnetic intensity map. A base level magnetic field has been removed. The compensation algorithm is not able to estimate the base level magnetic field, so the base level has been removed from the total magnetic intensity. A good estimate of the total magnetic field would be the residual magnetic field presented here with the average value of the theoretical International Geomagnetic Reference Filed (IGRF) added to it.

The invention has further applications to include other marine geological environments, such as gas hydrate deposits. In these environments, microbial activity associated with methane hydrates causes reduction of magnetic minerals that may produce small negative magnetic anomalies.

In some embodiments, the automatic or semi-automatic control of systems or components, as described above, is implemented by computer hardware, software, or a combination thereof.

What is claimed is:

1. A method for magnetic data compensation comprising:
providing at least one magnetometer mounted on a subsea vehicle;
maneuvering the subsea vehicle at a first altitude above a seafloor and at a first heading;
receiving, by a microprocessor, a first set of raw magnetic data from the at least one magnetometer based on the maneuvering;
receiving, by the microprocessor, subsea vehicle state data and subsea vehicle performance data concurrently with the receiving of the first set of raw magnetic data; and
processing, by the microprocessor, the subsea vehicle state data, the subsea vehicle performance data, and the first set of raw magnetic data to produce magnetic compensation coefficients, wherein the produced magnetic compensation coefficients do not reference the Earth's geodetic frame of reference.

2. The method of claim 1, wherein the produced magnetic compensation coefficients reference a frame of reference comprising the at least one magnetometer and the subsea vehicle.

3. The method of claim 1, wherein the processing is independent of an ambient magnetic field so that influence of the ambient magnetic field is not taken into account.

4. The method of claim 1, further comprising performing a subsea mapping and receiving a second set of raw magnetic data output from the at least one magnetometer while performing the subsea mapping.

5. The method of claim 4, further comprising applying the magnetic compensation coefficients to the second set of raw magnetic data to produce compensated magnetic survey data.

6. The method of claim 1, further comprising maneuvering the subsea vehicle at a second altitude above the seafloor at the first heading.

7. The method of claim 4, further comprising maneuvering the subsea vehicle at a second altitude above the seafloor, wherein the subsea mapping is performed at a survey altitude above the seafloor, the survey altitude between and including the first altitude and the second altitude.

8. The method of claim 1, further comprising maneuvering the subsea vehicle at a second altitude above the seafloor at a second heading.

9. The method of claim 1, further comprising maneuvering the subsea vehicle at the first altitude above the seafloor at a heading 180 degrees from the first heading.

10. The method of claim 1, wherein the maneuvering step comprises maneuvering the subsea vehicle in a rectangular loop.

11. The method of claim 1, wherein the subsea vehicle state data comprises a depth of the subsea vehicle form the sea surface and an altitude of the subsea vehicle above the seafloor.

12. The method of claim 1, wherein the subsea vehicle performance data comprises variable thruster motor currents.

13. The method of claim 1, wherein the subsea vehicle comprises one of an ROV and an AUV.

14. The method of claim 1, wherein the maneuvering the subsea vehicle at the first altitude and at the first heading is part of a series of maneuvers that moves the subsea vehicle in one of a clockwise direction and a counter-clockwise direction in a first loop that comprises a first plurality of legs.

15. A system to produce compensated magnetic underwater survey data comprising:
at least one magnetometer configured to mount to a subsea vehicle;
a non-transitory computer readable medium including instructions;
a processor in communication with the non-transitory computer readable medium, the processor operable to execute the instructions to:
receive a first set of raw magnetic data from the at least one magnetometer;
receive subsea vehicle state data and subsea vehicle performance data concurrently with the receiving of the first set of raw magnetic data;
processing the subsea vehicle state data, the subsea vehicle performance data, and the first set of raw magnetic data to produce magnetic compensation coefficients;
receiving a second set of raw magnetic data output from the at least one magnetometer while performing the subsea mapping;
applying the magnetic compensation coefficients to the second set of raw magnetic data to produce compensated magnetic survey data;
wherein the first set of raw magnetic data is collected while the subsea vehicle maneuvers at a first altitude above a seafloor and a first heading;
wherein the second set of raw magnetic data is collected while the subsea vehicle is performing the subsea mapping; and wherein the produced compensated magnetic survey data does not reference the Earth's geodetic frame of reference.

16. The system of claim 15, wherein the magnetic compensation coefficients reference a frame of reference comprising the at least one magnetometer and the subsea vehicle.

17. The system of claim 15, wherein the processing is independent of an ambient magnetic field so that influence of the ambient magnetic field is not taken into account.

18. The system of claim 15, wherein the subsea vehicle state data comprises a depth of the subsea vehicle from the sea surface and an altitude of the subsea vehicle above the seafloor.

19. The system of claim 15, wherein the subsea vehicle performance data comprises variable thruster motor currents.

20. A method for magnetic data compensation comprising:
providing at least one magnetometer mounted on a subsea vehicle;
maneuvering the subsea vehicle at a first altitude above a seafloor and at a first heading;
receiving, by a microprocessor, a first set of raw magnetic data from the at least one magnetometer based on the maneuvering;
receiving, by the microprocessor, subsea vehicle state data and subsea vehicle performance data concurrently with the receiving of the first set of raw magnetic data; and
processing, by the microprocessor, the subsea vehicle state data, the subsea vehicle performance data, and the first set of raw magnetic data to produce magnetic compensation coefficients, wherein the produced magnetic compensation coefficients do not reference the Earth's geodetic frame of reference,
wherein the maneuvering the subsea vehicle at the first altitude and at the first heading is part of a series of maneuvers that moves the subsea vehicle in one of a clockwise direction and a counter-clockwise direction in a first loop that comprises a first plurality of legs, and
wherein, subsequent to the subsea vehicle completing first plurality of legs, the series of maneuvers moves the subsea vehicle in the other of the clockwise direction and the counter-clockwise direction in a second loop comprising a second plurality of legs.

21. The method of claim 20, wherein each leg in the first plurality of legs and the second plurality of legs includes a first portion of the leg where the subsea vehicle moves at the first altitude and a second portion of the leg where the subsea vehicle moves at a second altitude, different from the first altitude.

22. The method of claim 20, wherein the second loop is a reversal of the first loop that follows the same path as the first loop in reverse, and wherein the first and second loops are rectangular.

* * * * *